UNITED STATES PATENT OFFICE.

GEORGE PRESCOTT FULLER, OF NIAGARA FALLS, NEW YORK, ASSIGNOR TO NATIONAL ELECTROLYTIC COMPANY, OF NIAGARA FALLS, NEW YORK, A CORPORATION OF NEW YORK.

FORMALDEHYDE SOLUTION.

1,143,114.     Specification of Letters Patent.     Patented June 15, 1915.

No Drawing.     Application filed June 1, 1914. Serial No. 842,025.

*To all whom it may concern:*

Be it known that I, GEORGE PRESCOTT FULLER, a citizen of the United States, residing at Niagara Falls, county of Niagara, and State of New York, have invented certain new and useful Improvements in Formaldehyde Solutions, fully described and represented in the following specification.

This invention relates to the art of making formaldehyde solutions.

It has been the practice in the art heretofore to produce and ship formaldehyde in a strong or concentrated water solution, from which solutions of the desired strength can be made for technical purposes by mere dilution. The strong solution usually contains about 40% formaldehyde and this can then be diluted with water to give the desired solution of 5% to 10%, such as is employed for technical purposes.

It has been known that there are polymerization products of formaldehyde which exist in a solid form, as for example, paraformaldehyde $(CH_2O)_n$ and trioxymethylene, $(CH_2O)_3$. These solid products, however, are not adapted for ready solution in water. For example, paraformaldehyde is practically insoluble in cold water and is only fairly soluble in boiling water, while trioxymethylene is insoluble in both hot and cold water.

The principal object of this invention is to provide a process by which formaldehyde solutions for technical uses may readily be made from the solid polymerization products of formaldehyde with cold water or water at normal temperatures.

I have discovered that a polymerization product of formaldehyde, in solid form, may be mixed with a very small quantity of a suitable solubilizing material to form a solid composition, which, when united with water at ordinary temperatures, will readily produce a solution of formaldehyde in water, of a strength sufficient for all technical purposes, while at the same time the solubilizing material, or its residues, will be present in so small a quantity in the solution as to be incapable of exerting a deleterious influence in any of the known applications of formaldehyde solutions.

I have found that if solid polymerization products of formaldehyde be subjected to the action of a small amount of a base, in the presence of water, a complete solution of the solid takes place after a short time and at a normal temperature. Furthermore, instead of the use of a base, suitable salts, which, by secondary reactions, produce a base capable of reacting with the polymer of formaldehyde, may be employed as a solubilizing material. As such a base, I may employ any alkali base, such for example as the hydroxids of the alkali metals; but I have found it advantageous to use a salt of basic property, which by hydrolysis will set free a base, such, for example, as neutral sulfites, carbonates, arsenites, tetraborates, dimetal phosphates, pyro-phosphates, cyanids, &c., of the alkali metals. The best results are obtained, however, by the use of carbonates or sulfites, because the solid compositions therefrom are more stable and also more speedily dissolved in water. When such bases or salts are employed in very small amounts, a progressive solution of the polymeric aldehyde occurs. For example, I have determined that as little as 0.0005 molecular proportion of sodium sulfite will cause the solution of 1 molecular proportion of paraformaldehyde in water, at normal temperatures, giving a product containing 20%, by volume, of the paraformaldehyde. I am aware that sodium sulfite has been used in solution to react on polymerization products of formaldehyde, but in such prior uses known to me a molecular excess of sulfite has been used, thereby resulting in a definite association product of the aldehyde and the salt. One explanation of the reason for the different result attained by my invention is that possibly the alkali supplied as a base or that liberated by the hydrolysis of the basic salt causes the solution of a corresponding amount of formaldehyde to give a hypothetical sodium derivative of methylene glycol. This at once hydrolyzes and the alkali thereby liberated causes a further amount of aldehyde to enter in solution. This action continues up to a certain limit of concentration of the aldehyde, which, with sodium sulfite, as a solubilizing material, reaches about 25% to 30%.

It has long been known that polymers of formaldehyde are capable of reacting with solutions of strong alkalis, but in such case the resultant product is either methyl alcohol and formic acid, or condensation products, such as polyglycols, methylenitan, sugars, etc., according to the conditions of concentration and temperature.

It has also been known that strong solutions of sodium sulfite will react with trioxymethylene to give a loose association product, of 1 molecule of each, which, upon heating, undergoes a further reaction with the formation of a stable bisulfite compound, $CH_2O.NaHSO_3$, and the liberation of sodium hydroxid. Hence, it is important, in carrying out my invention, to use relatively small amounts of the solubilizing material, that is to say, a less-than-molecular amount of the solubilizing material, in order to accomplish the desired results.

While, as I have heretofore suggested, it is possible to use only 0.0005 molecular of sodium sulfite for solubilizing 1 molecular of paraformaldehyde, yet I find it better in practice to increase the proportion of sodium sulfite to approximately 0.003 molecular, because the stability and rapidity of solution are thus increased over those of the compounds of minimum proportion.

While the solubilizing material may be added to the water at the time the paraformaldehyde (or similar polymerization product) is to be dissolved to produce the desired formaldehyde solution, an important advantage of my present invention is that it permits me to incorporate the solubilizing material in proper proportions with the suitable polymerization product of formaldehyde, so that the resulting composition in solid form may be readily transported and handled on the market and is ready for use in making a formaldehyde solution, by the mere addition of water at ordinary temperatures. The great advantage of such a solid composition, over the strong solutions of formaldehyde as now manufactured and sold, is that 63% of the weight of the strong solutions consists of water and alcohol and hence by my invention the expense of transporting such additional weight, the dangers of breakage of containers for the liquid, the decomposition of the formaldehyde when kept, and similar disadvantages, obvious to those skilled in the art, are overcome.

The following specific example is given of a process which satisfactorily attains the object of my invention: 198 kg. of 95% paraformaldehyde is intimately mixed with 2 kg. of crystallized sodium sulfite. This composition is in solid form and will not deteriorate or undergo decomposition within any reasonable time, if properly packed. From this composition, a formaldehyde solution, satisfactory for all of the uses to which such formaldehyde solutions are put in actual practice, may be readily obtained by dissolving the solid in water at normal temperatures. For example, if 20 kg. of the above mentioned composition be united with 80 kg. of water, there will be obtained 100 kg. of a solution containing 20%, by volume, of formaldehyde. This solution also will contain, in addition to the formaldehyde, about 0.1% of added matter, due to the addition of the solubilizing material and consists of residues thereof, but the nature and amount of this residual matter is such that it is incapable of producing any harmful effect in any of the usual technical applications of the formaldehyde solution.

What is claimed is:—

1. The process of making a formaldehyde solution, which consists in reacting on a polymerization product of formaldehyde with a less-than-molecular proportion of a base, in the presence of water.

2. The process of making a formaldehyde solution, which consists in subjecting a polymerization product of formaldehyde, in the presence of water, to the action of a less-than-molecular proportion of a salt having a basic reaction.

3. The process of making a formaldehyde solution, which consists in subjecting a polymerization product of formaldehyde, in the presence of water, to the action of a less-than-molecular proportion of an alkali metal salt having a basic reaction.

4. The process of making a formaldehyde solution, which consists in subjecting a polymerization product of formaldehyde, in the presence of water, to the action of a less-than-molecular proportion of a salt which on solution in water will hydrolyze to set free a base.

5. The process of making a formaldehyde solution, which consists in subjecting a polymerization product of formaldehyde, in the presence of water, to the action of a less-than-molecular proportion of an alkali metal sulfite.

6. The process of making a formaldehyde solution, which consists in subjecting a polymerization product of formaldehyde, in the presence of water, to the action of a less than molecular proportion of sodium sulfite.

In testimony whereof, I have hereunto set my hand, in the presence of two subscribing witnesses.

GEORGE PRESCOTT FULLER.

Witnesses:
L. E. G. ZAUBOCKER,
V. J. STAFFORD.